US007577879B2

(12) United States Patent
Lantz et al.

(10) Patent No.: US 7,577,879 B2
(45) Date of Patent: Aug. 18, 2009

(54) PATCHING A MOBILE COMPUTING DEVICE SOFTWARE ERROR

(75) Inventors: Eric L. A. Lantz, Sammamish, WA (US); Anthony A. Leitao, Kirkland, WA (US); James A. Stulz, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 526 days.

(21) Appl. No.: 11/146,557

(22) Filed: Jun. 7, 2005

(65) Prior Publication Data

US 2006/0277442 A1 Dec. 7, 2006

(51) Int. Cl.
*G06F 11/00* (2006.01)
*G06F 9/44* (2006.01)

(52) U.S. Cl. .......................... 714/57; 714/38; 717/173
(58) Field of Classification Search .................. 714/38, 714/54, 57; 717/172, 173, 177, 178
See application file for complete search history.

(56) References Cited

U.S. PATENT DOCUMENTS

| 6,356,933 B2 * | 3/2002 | Mitchell et al. ............. 709/203 |
| 6,480,944 B2 * | 11/2002 | Bradshaw et al. ........... 711/162 |
| 6,640,317 B1 * | 10/2003 | Snow ........................... 714/38 |
| 6,961,874 B2 * | 11/2005 | Lodrige ........................ 714/38 |
| 6,964,034 B1 * | 11/2005 | Snow ........................... 717/121 |
| 7,146,531 B2 * | 12/2006 | Sarra et al. .................... 714/15 |
| 7,254,390 B2 * | 8/2007 | Coppinger et al. ........ 455/432.3 |
| 7,281,245 B2 * | 10/2007 | Reynar et al. ................ 717/173 |
| 7,472,386 B2 * | 12/2008 | Lo ............................... 717/173 |
| 7,509,636 B2 * | 3/2009 | McGuire et al. ............. 717/168 |
| 2002/0124065 A1 * | 9/2002 | Barritt et al. ................. 709/221 |
| 2003/0158911 A1 * | 8/2003 | Lou et al. ..................... 709/218 |
| 2004/0003389 A1 * | 1/2004 | Reynar et al. ................ 717/178 |
| 2005/0223374 A1 * | 10/2005 | Wishart et al. .............. 717/173 |

* cited by examiner

*Primary Examiner*—Joshua A Lohn
(74) *Attorney, Agent, or Firm*—Merchant & Gould

(57) ABSTRACT

A software error in a mobile computing device is patched in the field when an application executing on the device crashes. The usage pattern of the device determines the type of crash data that is submitted to a crash server. The crash data is compared to registration information to identify the availability of an application fix that overcomes the error that caused the device software to crash. Crash information that identifies information corresponding to the device where the crash occurred is submitted to a patch detection server. The patch detection server generates Extensible Markup Language (XML) schema based on the crash information. The application fix is located on the patch server using the XML schema and a patch identifier associated with the application fix. The device loads the application fix into memory to correct the error in the software code.

18 Claims, 3 Drawing Sheets

PATCHING A MOBILE COMPUTING DEVICE SOFTWARE ERROR

BACKGROUND

Software that controls the operation of a mobile computing device commonly comes from many different sources. The variety of mobile computing device software may come from the device manufacturer and from OEMs that provide additional drivers and applications to the mobile computing device. The different software must operate well together or errors will result during device operation. Unfortunately, all of the software is commonly not loaded to the device until just before the device is shipped from the manufacturer. The interaction of the different software is often not subject to thorough testing procedures before being shipped to customers. Sometimes the error may not be detected until the mobile computing device is used in the field.

Many times, the user must contact the original equipment manufacturer (OEM) or mobile communication service provider to correct software errors. OEMs and service providers incur significant costs due to help desk calls by users. OEMs and service providers prefer to provide software patches to correct errors in the field rather than have users bring their inoperative mobile computing devices to a retail outlet for service or exchange. Software patches sent to the mobile computing device in the field minimize costs incurred by providing direct customer service without face-to-face interaction with the customer. Customer satisfaction is also maintained because the user need not spend time addressing the defective mobile computing device.

Software patches seek to change the software as little as possible when providing a software fix. If a user does not invoke a particular application, even though there is a problem with the application, a fix need not be provided to the user's device. However, OEMs and service providers have no way of knowing which applications a user does or does not invoke on the device. Thus, whenever a significant application error occurs during processing, all users are provided with a fix whether or not the users invoke the application on the device.

SUMMARY

The present disclosure is directed to patching a mobile computing device software error. An error occurs while an application is executing in memory of the mobile computing device causing the application to crash. Crash data is compiled and sent from the mobile computing device to a crash server over an existing, non-cellular Internet connection. The crash data identifies the state of the mobile computing device and the exact execution location in the application at the time of the crash.

The crash server determines whether an application fix is available to patch the mobile computing device software error. An application fix may be available if the same crash had occurred previously and a patch was created to overcome the software error that caused the crash. The crash may have previously occurred on the same device or on another device. An application fix is determined to be available when the application fix has been previously registered on the crash server and assigned a patch identifier.

When a determination has been made that an application fix is available, crash information is forwarded from the crash server to a patch detection server. The crash information may include the crash data, the registration information, the patch identifier associated with the application fix, and other information necessary for patching the software error that caused the application to crash. The patch detection server processes the crash information to determine the type of crash that has occurred and the location of the corresponding application fix.

The patch detection server generates Extensible Markup Language (XML) schema based on the crash information to locate the applicable application fix on the patch server that is associated with the crash. The XML schema is forwarded to the patch server via a web services interface. The application fix is located on the patch server based on the XML schema and the patch identifier. The application fix is forwarded from the patch server to the mobile computing device. The application software is modified using the application fix to correct the error that caused the application to crash. The user may then be informed that the error has been addressed and normal device operations have been restored.

Other aspects of the invention include system and computer-readable media for performing these methods. The above summary of the present disclosure is not intended to describe every implementation of the present disclosure. The figures and the detailed description that follow more particularly exemplify these implementations.

DETAILED DESCRIPTION OF THE PREFERRED EMBODIMENT

The present disclosure is directed to patching a software error in a mobile computing device in the field when an application executing on the device crashes. The usage pattern of the device determines the type of crash data that is submitted to a crash server. The crash data is compared to registration information to identify the availability of an application fix that overcomes the error that caused the device software to crash. Crash information that identifies information corresponding to the device where the crash occurred is submitted to a patch detection server. The patch detection server generates XML schema based on the crash information. The XML schema is submitted to a patch server. The application fix is located on the patch server using the XML schema and a patch identifier associated with the application fix.

The patch server forwards the application fix to the device. The device receives the application fix and loads the application fix into memory to correct the error in the software code.

Embodiments of the present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
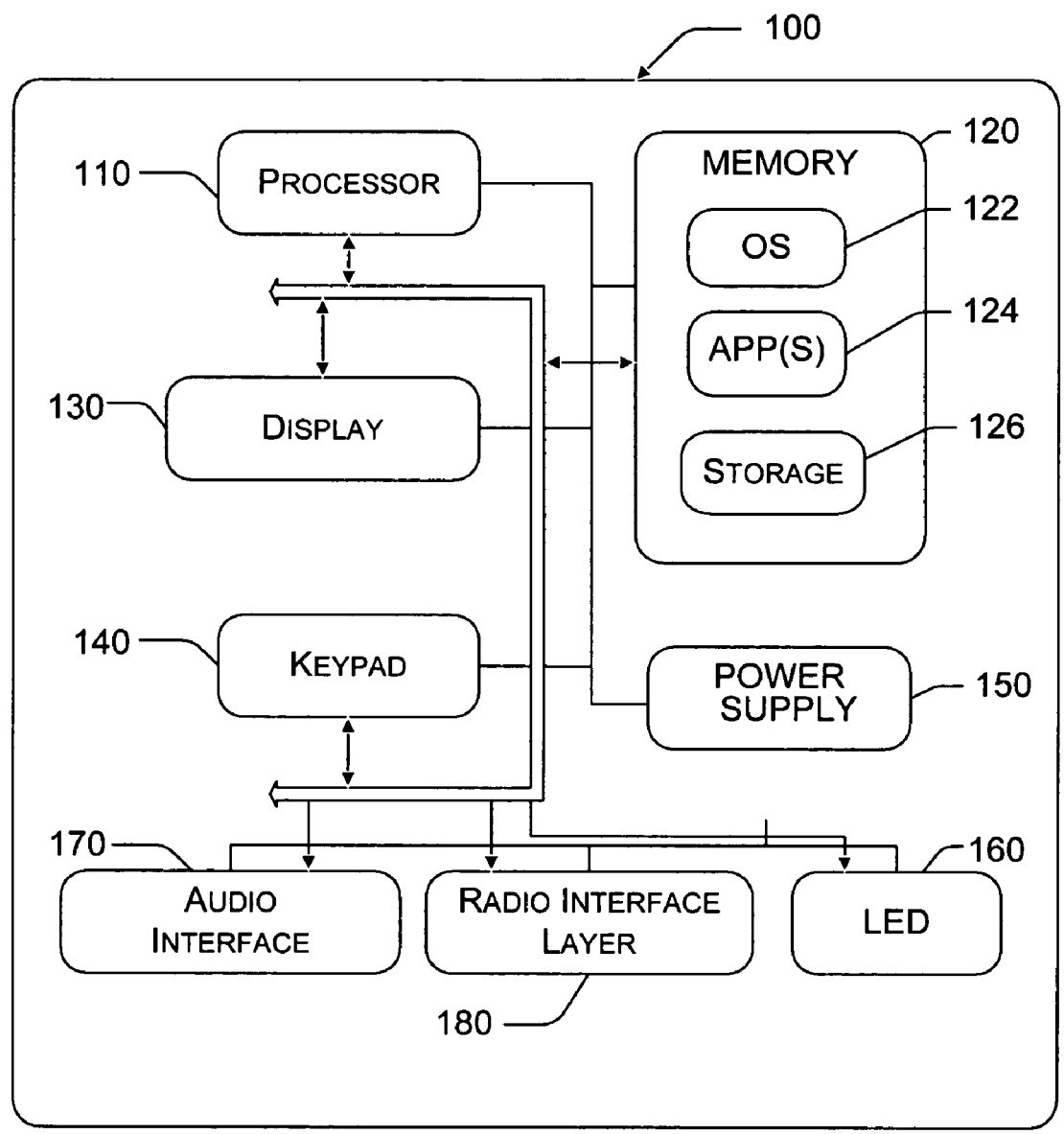
FIG. 1 illustrates a mobile computing device that may be used in one exemplary embodiment of the present invention.

FIG. 1 illustrates a mobile computing device that may be used in one exemplary embodiment of the present invention. With reference to FIG. 1, one exemplary system for implementing the invention includes a mobile computing device, such as mobile computing device 100. The mobile computing device 100 has a processor 110, a memory 120, a display 130, and a keypad 140. The memory 120 generally includes both volatile memory (e.g., RAM) and non-volatile memory (e.g., ROM, Flash Memory, or the like). The mobile computing device 100 includes an operating system 122, such as the Windows CE operating system from Microsoft Corporation or other operating system, which is resident in the memory 120 and executes on the processor 110. The keypad 140 may be a push button numeric dialing pad (such as on a typical telephone), a multi-key keyboard (such as a conventional keyboard). The display 130 may be a liquid crystal display, or any other type of display commonly used in mobile computing devices. The display 130 may be touch-sensitive, and would then also act as an input device.

One or more application programs 124 are loaded into memory 120 and run on the operating system 122. Examples of application programs include phone dialer programs, email programs, scheduling programs, PIM (personal information management) programs, word processing programs, spreadsheet programs, Internet browser programs, and so forth. The mobile computing device 100 also includes non-volatile storage 126 within the memory 120. The non-volatile storage 126 may be used to store persistent information which should not be lost if the mobile computing device 100 is powered down. The applications 124 may use and store information in the storage 126, such as e-mail or other messages used by an e-mail application, contact information used by a PIM, appointment information used by a scheduling program, documents used by a word processing application, and the like.

The mobile computing device 100 has a power supply 150, which may be implemented as one or more batteries. The power supply 150 might further include an external power source, such as an AC adapter or a powered docking cradle that supplements or recharges the batteries.

The mobile computing device 100 is shown with two types of external notification mechanisms: a Light Emitting Diode (LED) 160 and an audio interface 170. These devices may be directly coupled to the power supply 150 so that when activated, they remain on for a duration dictated by the notification mechanism even though the processor 110 and other components might shut down to conserve battery power. The LED 160 may be programmed to remain on indefinitely until the user takes action to indicate the powered-on status of the device. The audio interface 170 is used to provide audible signals to and receive audible signals from the user. For example, the audio interface 170 may be coupled to a speaker for providing audible output and to a microphone for receiving audible input, such as to facilitate a telephone conversation.

The mobile computing device 100 also includes a radio interface layer 180 that performs the function of transmitting and receiving communications, such as radio frequency communications. The radio interface layer 180 facilitates wireless connectivity between the mobile computing device 100 and the outside world, via a communications carrier or service provider. Transmissions to and from the radio interface layer 180 are conducted under control of the operating system 122. In other words, communications received by the radio interface layer 180 may be disseminated to application programs 124 via the operating system 122, and vice versa.

Patching a Mobile Computing Device Software Error

The present disclosure is described in the general context of computer-executable instructions or components, such as software modules, being executed on a mobile computing device. Generally, software modules include routines, programs, objects, components, data structures, and the like that perform particular tasks or implement particular abstract data types. Although described here in terms of computer-executable instructions or components, the invention may equally be implemented using programmatic mechanisms other than software, such as firmware or special purpose logic circuits.

Figure 2:
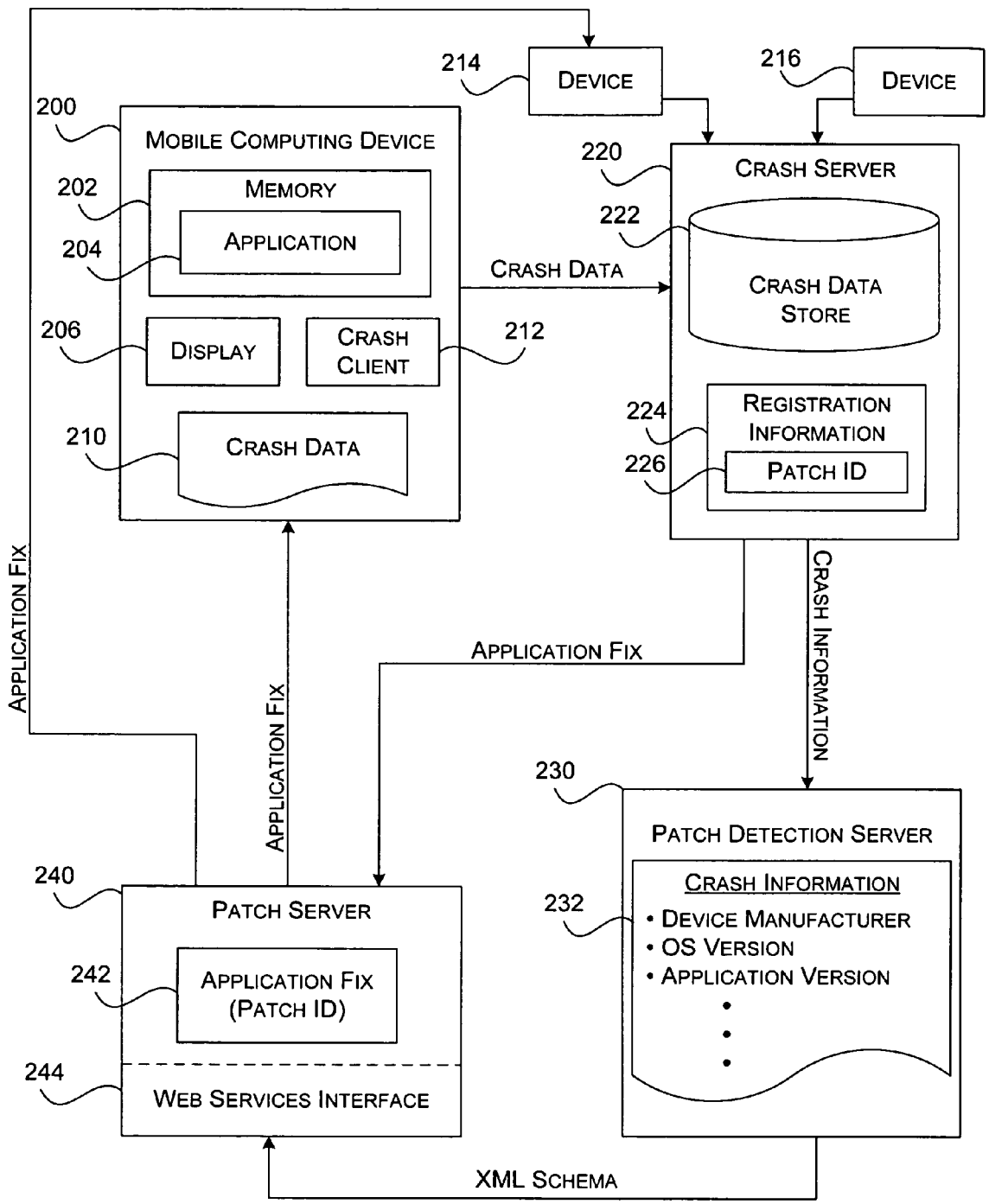
FIG. 2 illustrates functional block diagram of a system for patching a software error in a mobile computing device application, in accordance with at least one feature of the present invention.

FIG. 2 illustrates a functional block diagram of a system for patching a software error in a mobile computing device application. The system includes mobile computing devices 200, 214, 216, crash server 220, patch detection server 230, and patch server 240. Mobile computing devices 200, 214, 216 are coupled to crash server 220. Crash server 220 is further coupled to patch detection server 230 and patch server 240. Patch detection server 230 is further coupled to patch server 240. Patch server 240 is further coupled to mobile computing devices 200, 214.

Each mobile computing device 200, 214, 216 includes the components identified with reference to FIG. 1. Mobile computing device 200 includes memory 202, display 206, crash data 210 and crash client 212. Application 204 is loaded in memory 202. Crash server 220 includes crash data store 222 and registration information 224. Registration information includes patch identifier 226. Patch detection server includes crash information 232. Patch server 240 includes application fix 242 and web services interface 244.

Application 204 executes in memory 202. An error occurs during processing of application 204 such that the process that is executing application 204 crashes. A kernel in memory 202 detects the crash and compiles crash data 210. Crash data 210 identifies the state of mobile computing device 200 as well as the exact execution location in application 204 at the time of the crash. Thus, crash data 210 provides specific information about the errors that exist in application 204. Crash client 212 creates a crash data log and transmits crash data 210 to crash server 220.

In one embodiment, a user is prompted with a dialog on display 206 that seeks user acceptance before sending crash data 210 to crash server 220. For example, the dialog may read "The e-mail application has crashed. Do you want to send the e-mail application crash data to the manufacturer of the e-mail application so that an application fix can be generated and installed on your device?" The user may select a "Yes" control button. Crash data 210 is then transmitted to crash server 220. In one embodiment, the user is not prompted to send crash data 210 when the crash data associated with the same application crash has been previously sent to crash server 220. In this case, the crash data is deleted and is not forwarded to crash server 220.

Crash data 210 may be transmitted to crash server 220 when the application crashes. However, transmitting crash data 210 over a cellular connection can be costly for the user. Thus, crash data 210 may be transmitted to crash server 220 after the application crashes over an existing, non-cellular Internet connection. For example, crash data 210 may be transmitted to crash server 220 when the user docks mobile computing device 200 in a synchronization docking station, via a Wi-Fi network connection, via a BLUETOOTH network connection, through a modem card, or through some other connection that does not result in data charges to the user.

Crash server 220 receives crash data 210 and stores crash data 210 in crash data store 222. Crash data store 222 stores the crash data from many different mobile computing devices, such as devices 214, 216. A developer may access crash data 210 to determine whether a crash occurs frequently enough to require an application fix, i.e., a patch. In one embodiment, the developer accesses crash server 220 via a web service. The developer may be associated with an OEM, a service provider, or a software vendor. In one embodiment, the developer determines that a patch is required when several different crashes occur at the same location of application 204. The crash may occur on the same mobile computing device or on several different devices. The developer uses the crash data to identify, troubleshoot and provide application fixes for the most common crashes. In one embodiment, many of the most common application errors can be resolved with a few application fixes.

The developer generates application fix 242 to address and overcome the error that caused application 204 to crash. When generating application fix 242 the developer also identifies registration information 224 associated with mobile computing device 200. Registration information 224 associates mobile computing device 200 with the corresponding application fix and crash. Thus, registration information 224 may be used to determine the availability of an application fix when a crash subsequently occurs on a device. Registration information 224 identifies device information that application fix 242 is applicable to. For example, the registration information may identify a range of specific mobile computing device models, a range of device operating systems, and a range of application versions.

Application fix 242 is loaded from crash server 220 to patch server 240. Application fix 242 is associated with patch identifier 226. Patch identifier 226 may be used to locate the corresponding application fix when the error that the application fix was created to address is subsequently encountered. Patch identifier 226 may also be used to identify any patches that are dependent on application fix 242. Patch server 240 provides application fix 242 to mobile computing device 200. Application fix 242 modifies application 204 to correct the error that caused application 204 to crash. In one embodiment, application fix 242 is burned in memory 202 of mobile computing device 200. The user may be informed of the fixed application. For example, a dialog that reads, "The e-mail application error has been repaired", may appear on display 206. The user may then resume normal device operations. As other software problems arise, application fixes that address the errors may be created by a developer and provided to mobile computing device 200.

The same crash that occurred during execution of application 204 on mobile computing device 200 may occur when the same application is executed on another mobile computing device, such as device 214. Crash server 220 determines that the same crash has occurred and that application fix 242 is available on patch server 240 based on registration information 224. Crash server 220 transmits crash information 232 associated with the application that crashed on device 214 to patch detection server 230.

Patch detection server 230 receives crash information 232 from crash server 220. In one embodiment, patch detection server 230 trolls crash data store 222 on crash server 220 after the crash has occurred to obtain crash information 232. Crash information 232 may include the manufacturer of the device where the crash occurred, the operating system versions that the corresponding application fix may be used with, the application versions that the corresponding application fix is applicable to, and other information necessary for patching the error that caused the application to crash. Patch detection server 230 processes crash information 232 to determine the type of crash that has occurred, the location of the available application fix, or if anything else can be done to address the crash. In one embodiment, patch detection server 230 does not process crash information 232 until crash data is located on crash server 220 that has a corresponding application fix available on patch server 240. Patch detection server 230 generates XML schema from crash information 232 in response to determining that a corresponding application fix is available to correct the error that caused the application to crash. Patch detection server 230 provides the XML schema to patch server 240 via web services interface 244. Patch server 240 locates application fix 242 using patch identifier 226 and the XML schema, and then transmits application fix 242 to device 216. Application fix 242 modifies the application to address and overcome the error that caused the application to crash.

In summary, a software error occurring on a mobile computing device is patched in the field when an application executing on the device crashes. The usage pattern of the device determines the type of crash data that is submitted to a crash server. The crash data is compared to registration information to identify the availability of an application fix that overcomes the error that caused the device software to crash. Crash information that identifies information corresponding to the device where the crash occurred is submitted to a patch detection server. The patch detection server generates XML schema based on the crash information. The XML schema is submitted to a patch server. The application fix is located on the patch server using the XML schema and a patch identifier associated with the application fix. The patch server forwards the application fix to the device. The device receives the application fix and loads the application fix into memory to correct the error in the software code.

Figure 3:
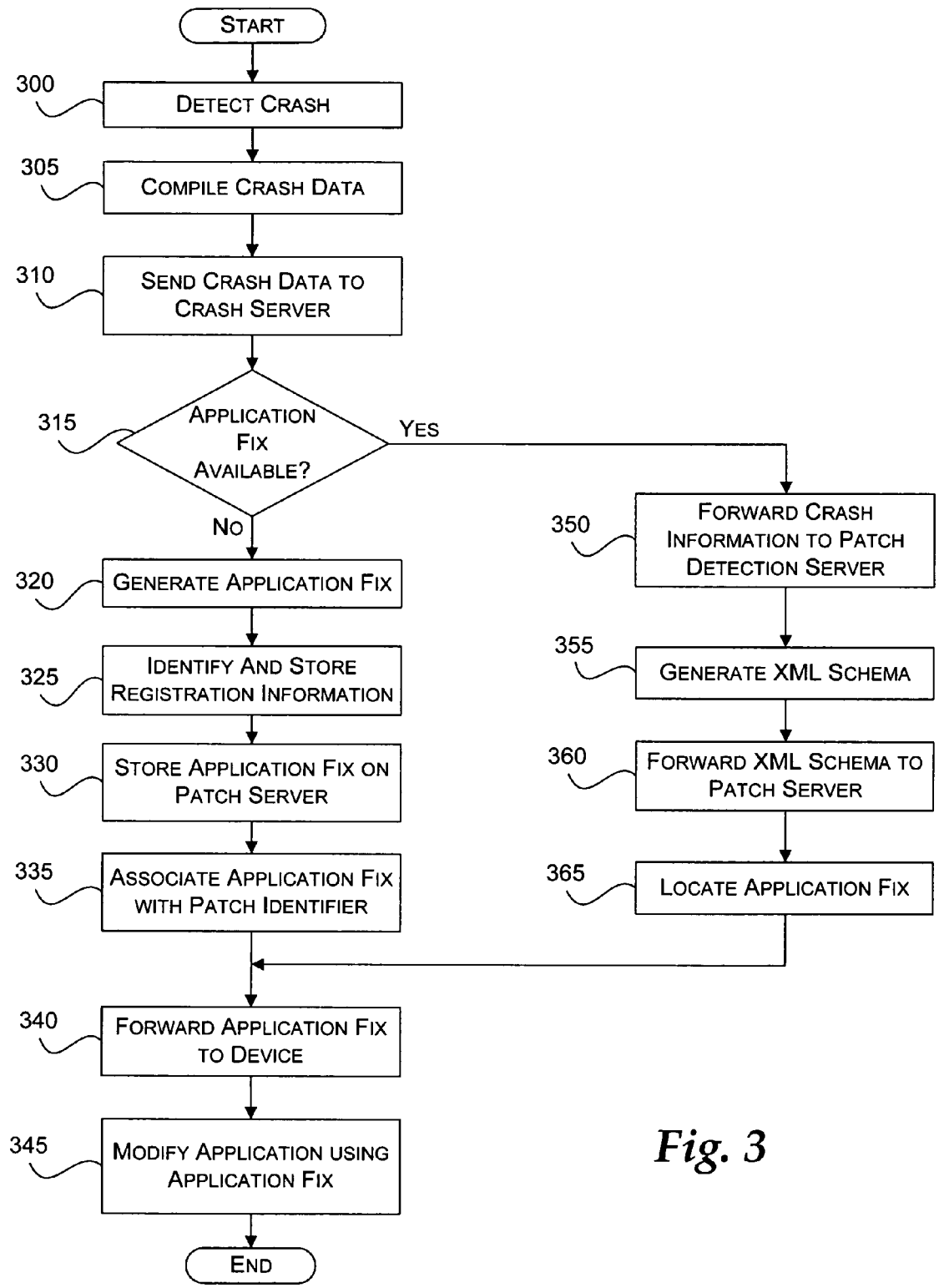
FIG. 3 illustrates an operational flow diagram illustrating a process for patching a software error in a mobile computing device application, in accordance with at least one feature of the present invention.

FIG. 3 illustrates an operational flow diagram illustrating a process for patching a software error in a mobile computing device application. The process begins at a start block where an application is executing in memory of a mobile computing device. An error occurs while the application is running causing the application to crash. The crash is detected at block 300.

Moving to block 305, crash data is compiled by a kernel in the memory of the mobile computing device. The crash data identifies the state of the mobile computing device and the exact execution location in the application at the time of the crash. Thus, the crash data provides specific information about the errors that exist in the application.

Proceeding to block 310, the crash data is sent from the mobile computing device to a crash server. The crash data may be transmitted to the crash server over an existing, non-cellular Internet connection. In one embodiment, the user is prompted with a dialog that requires user acceptance before forwarding the crash data to the crash server.

Advancing to decision block 315, a determination is made whether an application fix is available to patch the mobile computing device software error. An application fix may be available if the same crash had occurred previously and a patch was created to overcome the software error that caused the crash. An application fix is determined to be available when the application fix has been previously registered on the crash server and assigned a patch identifier. If an application fix is available, processing proceeds to block 350. If an application fix is not available, processing proceeds to block 320.

Transitioning to block 320, an application fix is generated by a developer. The developer may be associated with an OEM, a service provider, or a software vendor. The developer may access the crash data on the crash server through a web service. In one embodiment, the developer determines that a patch is required when several different crashes occur at the same location of an application. The developer uses the crash data to identify, troubleshoot and provide an application fix for the application error that caused the crash.

Continuing to block 325, registration information associated with the application fix is identified by the developer and stored on the crash server. The registration information associates the device where the crash occurred with the application fix such that the availability of the application fix may be determined the next time the same crash occurs. In one embodiment, the registration information identifies a range of specific mobile computing device models that the application fix is applicable to. In another embodiment, the registration information identifies a range of device operating systems that the application fix is compatible with. In yet another embodiment, the registration information identifies a range of application versions that the application fix can address errors existing therein.

Moving to block 330, the application fix is forwarded to and stored on a patch server. Proceeding to block 335, the application fix is associated with a patch identifier. The patch identifier is used to locate the application fix on the patch server when a determination is made that the application fix is available to patch an application software error on a device. In one embodiment, the patch identifier identifies any software patches that are dependent on the application fix.

Advancing to block 340, the application fix is forwarded to the mobile computing device. Transitioning to block 345, the application is modified using the application fix to correct the error that caused the application to crash. In one embodiment, the application fix is burned into the memory of the mobile computing device. The user may then be informed that the error has been addressed and normal device operations have been restored. Processing then terminates at an end block.

Continuing to block 350, where a determination has been made that an application fix is available, crash information is forwarded from the crash server to a patch detection server. The crash information may include the crash data, the registration information, the patch identifier associated with the application fix, and other information necessary for patching the software error that caused the application to crash. In one embodiment, the patch detection server trolls the crash server to locate the crash information associated with a particular crash. The patch detection server processes the crash information to determine the type of crash that has occurred and the location of the corresponding application fix.

Moving to block 355, XML schema is generated based on the crash information to locate the applicable application fix on the patch server that is associated with the crash. Proceeding to block 360, the XML schema is forwarded to the patch server via a web services interface. Advancing to block 365, the application fix is located on the patch server based on the XML schema and the patch identifier. Processing continues at block 340 as discussed above.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for patching a software error in a mobile computing device application, comprising:
   receiving crash data associated with the error at a crash server, wherein the crash data identifies the state of the mobile computing device and the application when the error occurred; wherein the error is an error that occurred during the execution of the mobile computing device application;
   determining the availability of an application fix that addresses the error, wherein the application fix is determined to be available when the crash data corresponds to registration information that identifies the mobile computing device, the application fix and the error;
   generating an Extensible Markup Language (XML) representation of data, wherein the XML data identifies the application fix and a patch identifier;
   receiving the XML data at a patch server via a web services interface, wherein the patch server:
      locates the application fix using the patch identifier identified by the XML data; and
      provides the application fix to the mobile computing device;
   modifying the application using the application fix, wherein the modified application overcomes the error.

2. The computer-implemented method of claim 1, further comprising locating a patch that is dependent on the application fix using the patch identifier.

3. The computer-implemented method of claim 1, further comprising:
   detecting the error when the application crashes; and
   compiling the crash data when the error is detected.

4. The computer-implemented method of claim 1, wherein receiving the crash data further comprises receiving the crash data over a non-cellular Internet connection.

5. The computer-implemented method of claim 1, further comprising:
   generating the application fix based on the crash data; and
   storing the application fix.

6. The computer-implemented method of claim 1, further comprising associating the registration information with the mobile computing device, the application fix and the error.

7. The computer-implemented method of claim 1, wherein the registration information identifies devices and device characteristics that the application fix is applicable to.

8. The computer-implemented method of claim 1, wherein the registration information comprises at least one of: a mobile computing device model, a mobile computing device operating system, and a mobile computing device application version.

9. The computer-implemented method of claim 1, wherein modifying the application further comprises burning the application fix in memory of the mobile computing device.

10. A system for patching a software error in a mobile computing device application, comprising:
    a mobile computing device configured to use a wireless cellular link as its primary mode of communication that is arranged to:
       execute the application,
       detect when the error occurs, wherein the error is an error that occurred during execution of the application such that a process that is executing the application crashes, determine whether crash data related to the error has been previously transmitted; and only in response to determining that the error has not been previously transmitted, compile crash data when the error is detected, wherein the crash data identifies the state of the mobile computing device and the application when the error occurred;

a crash server coupled to the mobile computing device, wherein the crash server is arranged to:

receive the crash data from the mobile computing device, determine the availability of an application fix that addresses the error, wherein the application fix is determined to be available when the crash data corresponds to registration information that identifies the mobile computing device, the application fix and the error;

a patch detection server coupled to the crash server, wherein the patch detection server is arranged to:

receive crash information from the crash server, the crash information based on the registration information and the crash data, process the crash information to determine the type of error and the location of the corresponding application fix, and generate an Extensible Markup Language (XML) file based on the crash information, wherein the XML file identifies the application fix and locates the application fix; and a patch server coupled to the patch detection server through a web services interface, wherein the patch server is arranged to receive the XML file from the patch detection server, locate the application fix based on the XML file and a patch identifier associated with the application fix, and send the application fix to the mobile computing device;

wherein the application is modified on the mobile computing device using the application fix such that the modified application overcomes the error.

11. The system of claim 10, wherein the mobile computing device is further arranged to transmit the crash data to the crash server over a non-cellular Internet connection.

12. The system of claim 10, wherein the application fix is generated based on the crash data, and further wherein the crash server receives the application fix from a developer that generated the application fix.

13. The system of claim 10, wherein the crash server is further arranged to associate the registration information with the mobile computing device, the application fix and the error.

14. The system of claim 10, wherein the registration information identifies devices and device characteristics that the application fix is applicable to.

15. The system of claim 10, wherein the mobile computing device is further arranged to modify the application by burning the application fix in memory of the mobile computing device.

16. A computer-readable storage medium having computer-executable instructions for patching a software error in a mobile computing device application, comprising:

receiving crash data associated with the error, wherein the crash data identifies the state of the mobile computing device and the application when the error occurred; wherein the error is an error that occurred during execution of the application;

determining the availability of an application fix that addresses the error, wherein the application fix is determined to be available when the crash data corresponds to registration information that identifies the mobile computing device, the application fix and the error;

generating crash information based on the registration information and the crash data;

processing the crash information to determine the type of error and the location of the corresponding application fix;

generating information represented by XML based on the crash information, wherein the XML information identifies the application fix and a patch identifier;

receiving the XML information;

locating the application fix based on the XML information and the patch identifier associated with the application fix;

providing the application fix to the mobile computing device;

modifying the application using the application fix, wherein the modified application overcomes the error.

17. The computer-readable medium of claim 16, further comprising associating the registration information with the mobile computing device, the application fix and the error.

18. The computer-readable medium of claim 16, wherein the registration information identifies devices and device characteristics that the application fix is applicable to.

* * * * *